United States Patent [19]

Vegh et al.

[11] 3,954,052
[45] May 4, 1976

[54] TILTABLE COOKING RECEPTACLE APPARATUS

[75] Inventors: Elmer S. Vegh, Lyndhurst; Donald F. Klier, Parma, both of Ohio

[73] Assignee: Alco Standard Corporation, Cleveland, Ohio

[22] Filed: Feb. 22, 1974

[21] Appl. No.: 444,782

[52] U.S. Cl. .................................. 99/407; 99/352; 222/166
[51] Int. Cl.² ...................................... A47J 37/12
[58] Field of Search ............ 99/352, 355, 373, 375, 99/396, 407, 424, 446; 222/166

[56] References Cited
UNITED STATES PATENTS

| | | | |
|---|---|---|---|
| 625,607 | 5/1899 | Rose | 222/166 |
| 3,068,912 | 12/1962 | Shaw | 99/407 X |
| 3,119,530 | 1/1964 | Swanson | 222/166 |
| 3,211,344 | 10/1965 | Ekman et al. | 222/166 |
| 3,797,377 | 3/1974 | Lotter et al. | 99/424 X |

Primary Examiner—Stanley N. Gilreath
Assistant Examiner—Arthur O. Henderson
Attorney, Agent, or Firm—Teare, Teare & Sammon

[57] ABSTRACT

A tiltable cooking receptacle apparatus which includes a frame and a receptacle supported on the frame for tilting movement toward one side of the receptacle between an upright position and a tilted position. A lever assembly is mounted on the frame for tilting the receptacle. The lever assembly includes a tilt arm which acts on the side of the receptacle in the direction of tilting movement for tilting the receptacle in said direction. The tilt arm is mounted for movement relative to the frame between a lowered non-tilted position and a raised tilted position, and is mounted for pivotal movement in the direction opposite to the direction of pivotal movement of the receptacle. Selectively actuatable drive means is operably connected to the tilt arm for moving the tilt arm between the lowered and raised positions to move the kettle between the upright position and the tilted position.

18 Claims, 16 Drawing Figures

TILTABLE COOKING RECEPTACLE APPARATUS

BACKGROUND OF THE INVENTION

The present invention is related to cooking apparatus of the type used in cooking or preparing large quantities of food, and more particularly, to an apparatus having a tiltable receptacle, such as a kettle, skillet or the like, to enable discharge of the contents therefrom.

In the preparation or cooking of large quantities of foods, receptacles of very large size are used. Accordingly, it is extremely difficult and cumbersome to manually manipulate such large receptacles to discharge the food materials prepared therein after they have been prepared. Therefore, it becomes expedient to employ a tilting mechanism which has sufficient power to manipulate such large receptacles, and particularly, when they are full of food materials. In addition to requiring sufficient power to lift such heavy loads, the tilting mechanism must also be capable of controlling the tilting speed so that the contents are not spilled during the pouring operation which could result from the contents being discharged too rapidly.

SUMMARY OF THE INVENTION

The present invention contemplates providing an improved tiltable cooking receptacle apparatus of the type used in the preparation or cooking of large quantities of food material. The apparatus of the present invention includes a frame and has a receptacle supported on the frame for tilting movement toward one side of the receptacle between a normally upright position, when the food materials are being prepared, and a tilted position, when discharging the food materials. The receptacle is pivotally connected to the frame adjacent said one side. A tilting mechanism is mounted on the frame and acts on the receptacle for tilting the receptacle toward said one side. The tilting mechanism includes a tilt arm which is engageable with the receptacle, such as with said one side, and is mounted for movement relative to the frame in a direction opposite to the direction of pivotal movement of the receptacle, between a lowered non-tilting position and a raised tilting position. A selectively actuatable drive assembly is operably connected to the tilt arm for moving the tilt arm from the lowered, non-tilting position to the raised, tilting position for tilting the receptacle toward said one side between the upright position and a tilted position for discharging the food material contents from the receptacle. The tilt arm is pivotally supported on the frame between its opposed ends and has one end disposed for cramming coacting engagement with the receptacle and the other end operably connected to the drive means. The drive means is provided in the form of a ball screw and nut coupling which is coupled in camming sliding relation to the other end of the tilt arm to impart smooth pivotal movement to the receptacle. More particularly, the nut coupling includes a pin member which is pivotally coupled in sliding relation with the tilt arm for rotating the arm about its pivotal connection with the frame for raising the arm from its lowered position to tilt the receptacle, and lower the arm from its raised position to lower the receptacle to its normal upright position. The drive means includes a rotatable drive assembly which, in one form, may be an electric motor drive or, in another form, a hand crank which is coupled to the screw member to impart rotation thereto for moving the nut member into coacting camming engagement with the other end of the tilt arm and relative to the frame in one direction for raising the tilt arm and in the opposite direction for lowering the tilt arm.

DESCRIPTION OF THE PREFERRED EMBODIMENTS

Figure 1:
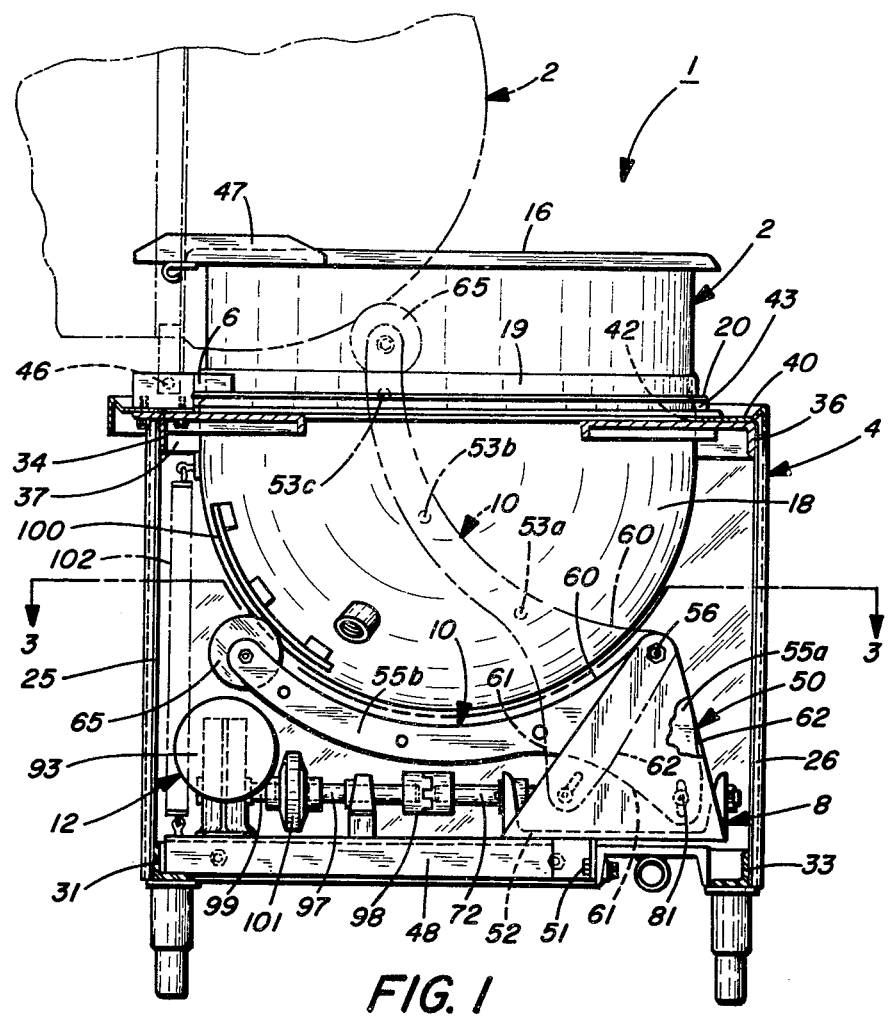
FIG. 1 is a side elevation view, partially in section and partially cut-away, of the apparatus of the present invention.

One embodiment of the tiltable cooking receptacle apparatus of the present invention is illustrated, generally at 1, in FIG. 1 and is shown as including a receptacle in the form of a kettle 2 which is pivotally mounted, such as by a hinge assembly 6, on a frame 4 for tilting movement between a normal, generally upright or vertical position, indicated by the solid lines at 2, and a tilted, generally horizontal pouring position, indicated by the phantom lines at 2. A tilting mechanism 8 is supported on the frame 4 and includes a tilt arm 10 which cammingly coacts on the side of the kettle 2 for imparting tilting movement thereto. The tilting mechanism 8 includes a selectively actuatable drive assembly 12 for moving the tilt arm 10 between a lowered, non-tilting position, such as indicated by the solid lines at 10, and a raised, tilting position, such as indicated by the phantom lines at 10, for tilting the kettle about its pivotal connection for discharging or pouring the contents, such as prepared food material, therefrom and for lowering the kettle to its normal, upright position after the contents have been discharged.

The kettle 2 is shown as having a generally conventionally configured body which includes an open top end defined by an endless peripheral rim 16 and a rounded, generally semi-spherical bottom end 18. An annular support ring 19 is disposed circumferentially above the kettle 2, being spaced downwardly from the rim 16. The ring 19 includes a radially outwardly extending flange 20 which is adapted for seated engagement on the frame 4 for supporting the kettle in its normal upright untilted position.

Figure 2:
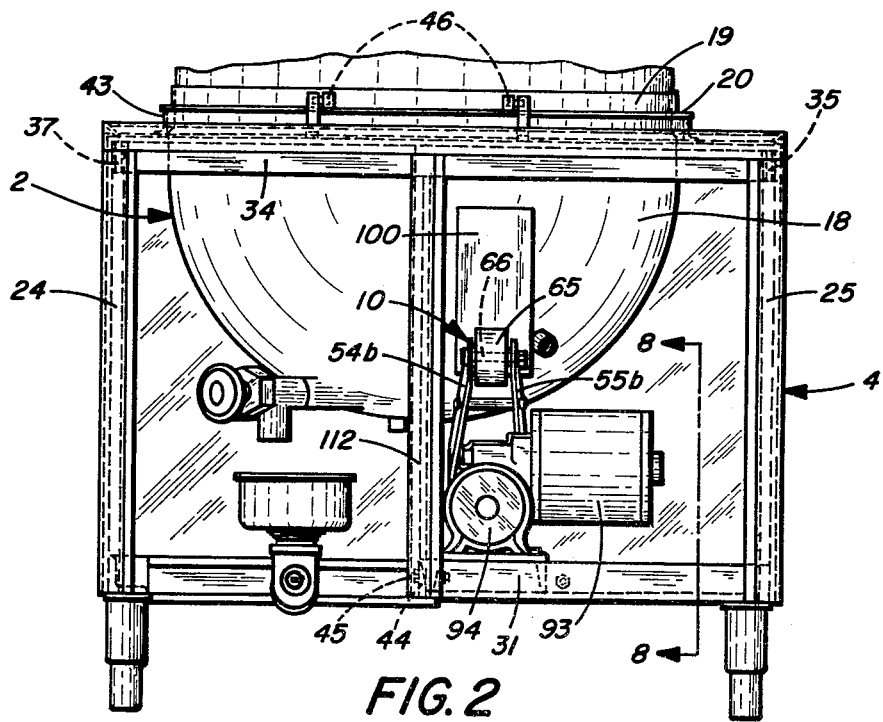
FIG. 2 is a front elevation view, partially in section of the apparatus shown in FIG. 1.
Figure 3:
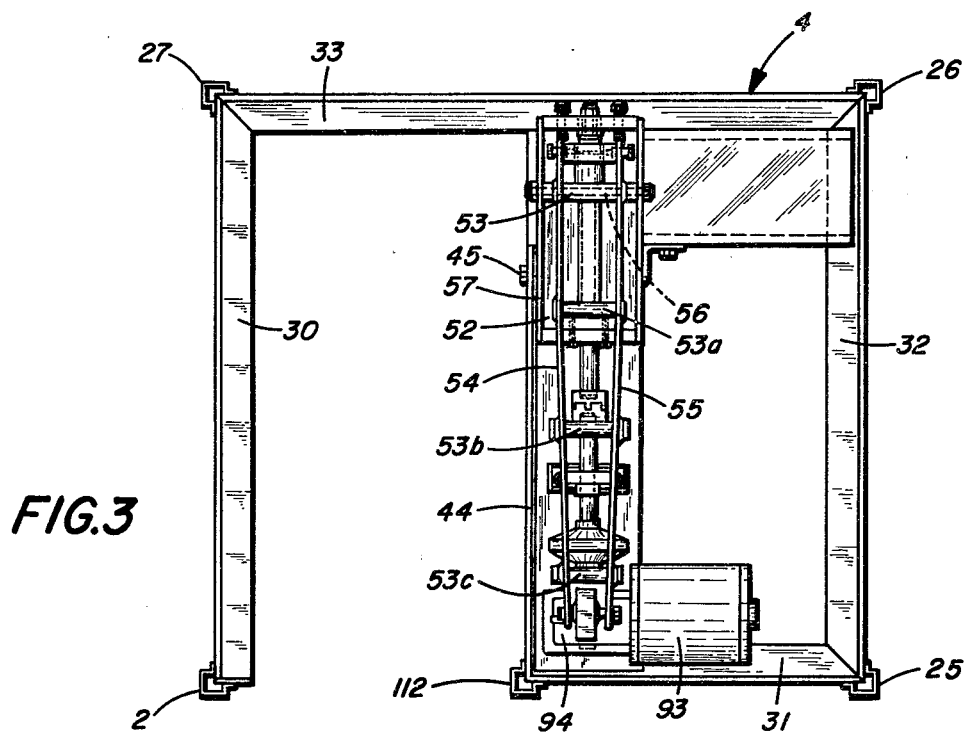
FIG. 3 is a top plan view taken along the lines 3—3 of FIG. 1.

The frame 4 is shown as having a generally box-like construction which is defined by generally upright vertically extending corner posts 24, 25, 26 and 27 as shown in FIGS. 1, 2 and 3. The posts 24, 25, 26 and 27 are held at their lower ends in stationary relation with respect to one another by generally horizontally extending lower struts 30, 31, 32 and 33 (FIG. 3), and at their upper end by upper struts 34, 35, 36 and 37 (FIG. 1 and 2). A top cover plate 40 is fitted over the upper struts 34, 35, 36 and 37, and includes a central opening 42 to receive that portion of the kettle 2 which extends below the ring 19, such as the bottom end 18. Another support ring 43 is mounted on the frame 4 which is fitted within the opening 42 and is secured, such as welding or the like, to the cover plate 40. The ring 43 has maximum diameter which is less than the minimum diameter of the flange 20, such that the flange 20 will seatingly rest on the ring 43 when the general plane of the flange 20 extends in the general horizontal direction and the kettle 2 is in the upright position.

As stated, the hinge assembly 6 pivotally connects the kettle 2 to the frame 4, such as by a pin 46, to enable pivotal movement of the kettle about a generally horizontal axis between the tilted pouring position and the upright position. The hinge assembly 6 is located adjacent the front or pouring side of the kettle 2, and the kettle 2 includes a spout 47 which extends radially outwardly from the front or pouring side thereof.

Figure 4:
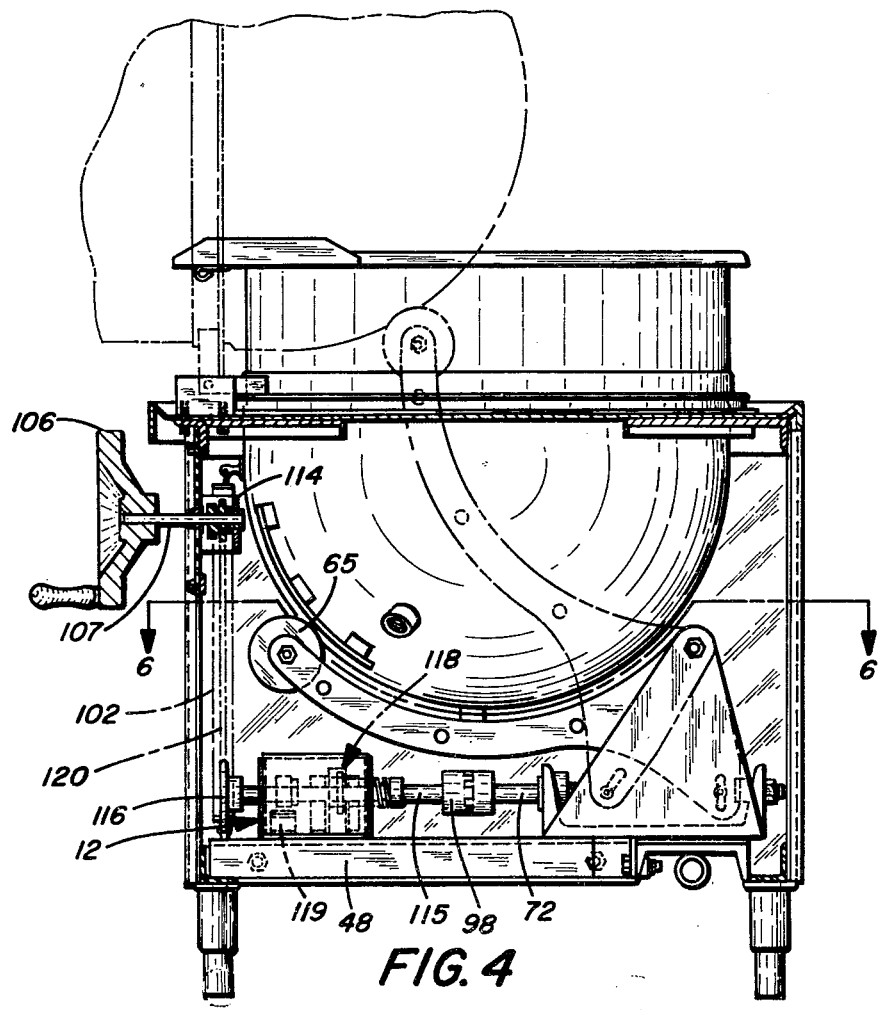
FIG. 4 is a side elevation view, partially in section and partially cut-away, of another embodiment of the present invention.
Figure 5:
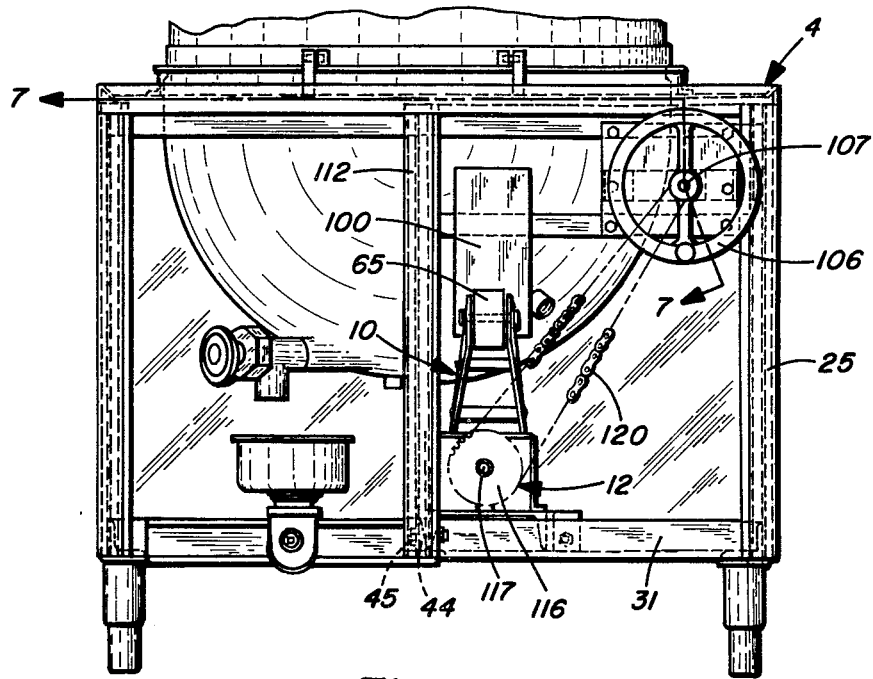
FIG. 5 is a front elevation view, partially in section and partially cut-away, of the apparatus shown in FIG. 4.

As shown in FIGS. 1 to 5, the tilt mechanism 8 is supported on the base 4 beneath the kettle 2 by a base plate 48. The base plate 48 is in turn supported adjacent its front end by the strut 31 and at its rear end by another base plate 49. As shown in FIGS. 3 and 5, the strut 31 terminates approximately midway between the struts 30 and 32, and is connected at its inner distal end, such as by welding or the like, to a lower center strut 44 which extends rearwardly being connected, such as by bolts 45, to the base plate 48. The base plate 49 extends generally transversely of the lengthwise direction of the base plate 48 and extends from the strut 31 to approximately midway between the struts 30 and 32. As shown, the base plate 48 may be secured to the strut 31, such as by the bolt 50, and to the base plate 49, such as by the bolt 51. The base plate 49 is supported at one end on the strut 32, and along its rear side or edge by the strut 33 being secured thereto, such as by welding or the like.

Figure 9:
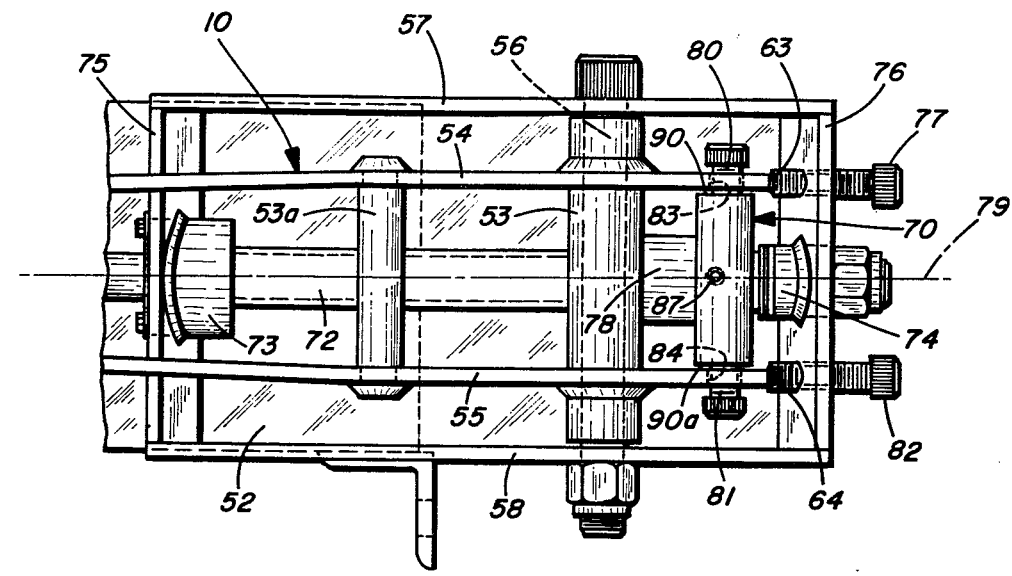
FIG. 9 is a top plan view taken along the lines 9—9 of FIG. 8.

In the form shown in FIGS. 1 to 4, the tilting mechanism 8 includes a lever assembly 50 which is mounted on a support fixture, such a channel section 52, which is rigidly secured, such as by welding or the like, to the upper side of the base plate 48 adjacent the rear side of the kettle, or in other words, the side opposite to the pouring side. As best seen in FIGS. 1 and 3, the tilt arm 10 is shown as being formed by a pair of spaced, laterally-extending lever members 54 and 55 which are of an elongated, generally arcuate configuration in side elevation (FIG. 1). Referring now also to FIG. 9, the lever members 54 and 55 are rigidly secured, such as by welding or the like, to the opposite ends of a tube member 53. The tube member 53 is mounted for pivotal movement in a generally vertical plane about a generally horizontally extending pin 56, which is supported at its opposite ends between and adjacent the upper ends of a pair of spaced, oppositely disposed plates 57 and 58. The plates 57 and 58 are shown as being generally triangular in configuration, as seen in side elevation in FIG. 1 and 4, and are secured to opposite sides of the channel section 52 and project upwardly away from the base plate 49. Additional tubes or rods 53a, and 53b and 53c (FIG. 3) are secured between the lever members 54 and 55 to provide increased rigidity.

Each of the lever members 54 and 55 is enlarged at its pivotally connected end forming a generally triangularshaped, downwardly-depending cam portion, only one is shown at 55a as seen in side elevation in FIGS. 1 and 4. Each cam portion 55a has an upper 60, front 61, and rear 62 edge. The lever members 54 and 55 are pivotally connected to the pin 56 adjacent the corners, formed by the upper 60 and rear 62 edges thereof. Each lever member 54 and 55 has an elongated lever portion, such as at 54b and 55b which extend forwardly from the cam portion 55a in a direction toward the front side of the kettle 2.

As shown in FIG. 2, each lever portion 54b and 55b extends beneath the kettle 2 being curved upwardly in a direction toward the front end so as to generally conform to the configuration of the kettle's rounded bottom side 18. A roller 65 is rotatably mounted, such as on a pin 66, adjacent the forward end of the tilt arm 10 for rotation about a generally horizontal axis and is disposed for rolling engagement with the forward portion of the bottom side 18 of the kettle 2 as will be described more fully hereinafter. The rotational axis of the roller 65 and the pivotal axis of the pin 56 are spaced approximately equidistantly from the center of the kettle 2 in a direction toward the front side and rear side thereof, respectively.

Figure 8:
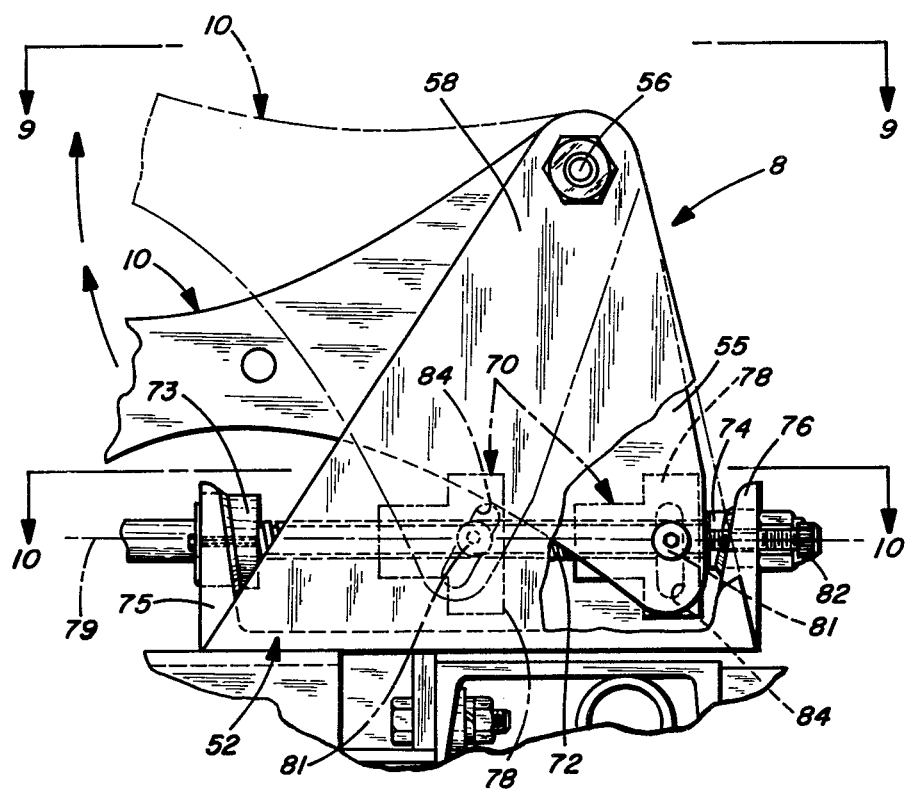
FIG. 8 is an enlarged, fragmentary, partially in section view taken along the lines 8—8 of FIG. 2.
Figure 10:
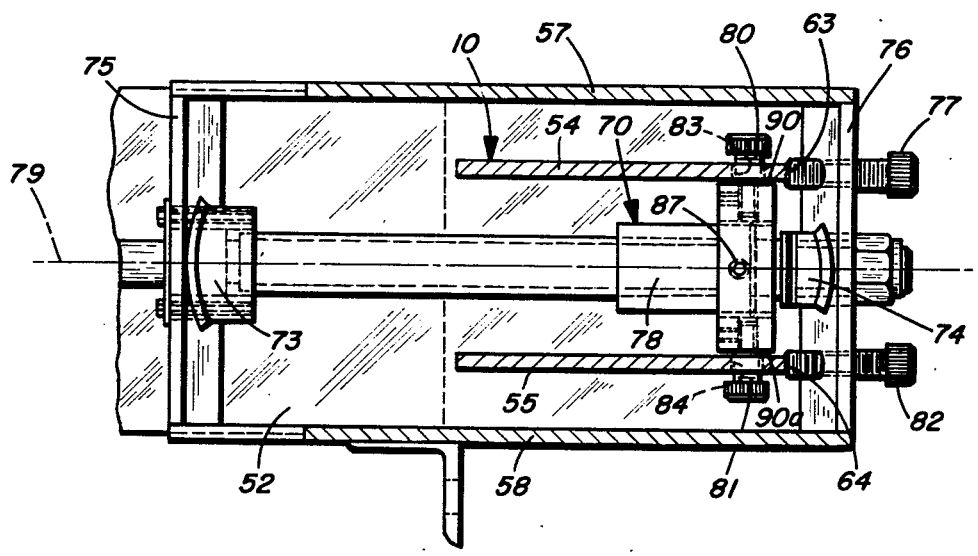
FIG. 10 is a transverse sectional view taken along the lines 10—10 of FIG. 8.

Referring now to FIGS. 8 to 10, the tilt mechanism 8 further includes a tilt actuator assembly 70 for actuating the tilt arm 10. As shown, the tilt actuator assembly 70 includes a rotatable screw 72 which is journaled for rotation in roller thrust bearings 73 and 74 which are mounted on the oppositely disposed, generally upright flanges 75 and 76 of the channel section 52. As shown, the screw 72 has its axis of rotation 79 extending in the lengthwise direction of the tilt arm 10 and is positioned below the pin 56. A moveable nut 78 is coupled, such as by threaded connection, to the screw 72 for movement between a rearward position adjacent the flange 75, such as is indicated by the dotted lines at 78 and a forward position adjacent the flange 76, such as indicated by the phantom lines at 78, upon rotation of the screw 72 (FIG. 8). In the form shown, and when viewing the screw 72 along its rotational axis and from the left side of FIG. 8, rotation of the screw 72 in one direction, such as in the clockwise direction, will cause the nut 78 to travel toward its forward position into abutting engagement with the thrust bearing 73, and rotation of the screw 72 in the opposite direction, such as in a counter clockwise direction, will cause the nut 78 to move toward the flange 76 into abutting engagement adjacent the thrust bearing 74. A pair of adjustable stop screws 77 and 82 are threadably inserted through flange 76 and project forwardly therefrom. The stop screw 77 and 82 are axially aligned with the general plane of the lever members 54 and 55 for engaging the rear edges 63 and 64 thereof respectively, to stop the downwardly pivotally movement of the tilt arm 10 and to limit the rearward movement of the nut 78.

The nut 78 is shown as including generally horizontally extending axially aligned pins 80 and 81 which project outwardly in opposite directions from the opposite sides of the nut 78 and extend toward the respective plates 57 and 58 and through oppositely-disposed slots, as at 83 and 84, for slidable, camming coacting engagement with the lever members 54 and 55, respectively. As best shown in FIGS. 9 and 10, the nut 78 includes a cylindrical body 85 having a base portion 86 of enlarged dimensions at its rear end. The base portion 86 may be of a polygonal-shape having flat sides 90 and 90a, and fitted over the body 85 such as by press fit and held in position thereon by a set screw 87. The pins 80 and 81 are threadably connected to the base portion and include enlarged heads 88 and 89 which protrude outwardly from the vertical sides of the base portion 86, a distance slightly greater than the thickness of the lever member 54 and 55 to enable the pins 81 and 82 to slide freely in the slots 83 an 84 while at the same time prevent rotation of the nut 78.

As can be seen best in FIG. 8, the lengthwise dimension of each of the slots 83 and 84 is disposed in a generally vertical orientation and rearwardly of the pin 56 when the nut 78 and lever members 54 an 55 are in their rearward position and the tilt arm 10 is in the lowered position. On the other hand, the lengthwise dimension of each of the slots 83 and 84 is disposed in generally angular relation with respect to the vertical, such as at an angle of 45° thereto, when the nut 78 is in its forward position and the tilt arm 10 is in the raised position. As shown, each slot is formed such that there is clearance provided above and below the pin when the lever members 54 and 55 are disposed in the rearward position to enable the pins 80 and 81 to slide in the lengthwise direction in the slots 83 and 84 and enable lever members 54 and 55 to pivot unrestrictedly forwardly about the pin 56 and to limit pivotal movement of the lever members 54 and 55 upon a pre-determined angular rotation in the forward direction upon abutting engagement of the pins 80 and 81 with the lower ends of the slots 83 and 84.

In one form of the invention as shown in FIGS. 1 to 3, the drive mechanism 12 comprises a rotatable power unit, such as a gear motor 93, which is coupled to the screw 72 through gear reducer 94 which, in turn, rotates a drive shaft 97. The drive shaft 97 is coupled by a flexible coupling 98 to the screw 72 for imparting rotation thereto, and to the output shaft 99 of the gear reducer 94 by clutch mechanism 101. More particularly, the clutch mechanism 101 is of the slip-type.

The clutch mechanism 101 acts to prevent overloading of the motor 98 and prevent the nut 78 from exerting excessive pressure on the upright flanges 75 and 76. The gear motor 93 is of the reversible, A-C type, and the gear reducer 84 preferably has a large input-output speed reduction. The motor 93 may be connected to a conventional motor starter (not shown) to any suitable source of power, as well known in the art, for starting and stopping the motor when desired.

As shown in FIGS. 1 and 2, a runner plate 100 is fixed to the front side of the kettle 2 for rolling engagement with the roller 65 as the tilt arm 10 is raised upwardly.

The runner plate 100 is curved and extends downwardly along the front side of the kettle 2, following the contour thereof, from a point adjacent the hinge 45 to approximately the center of the kettle 2 adjacent the bottom side 18. The runner plate 100 may be secured to the kettle in any suitable manner, such as by welding or other means. As shown, the tilt arm 10, and roller 65 and runner plate are offset with respect to the center of the kettle to provide a more compact structure and effectively reduce the length of the tilt arm 10. A flexible, resilient return element 102, such as a helical spring, is connected at its one end, such as its upper end, to the kettle 2 at a point adjacent to and below the hinge 45 and at its other end, such as its lower end, to the base plate 48 adjacent its forward end and acts to resist rotation of the kettle toward the tilted position and to hold the kettle in engagement with the roller 65 when the tilt arm 10 is in the fully raised position.

Figure 6:
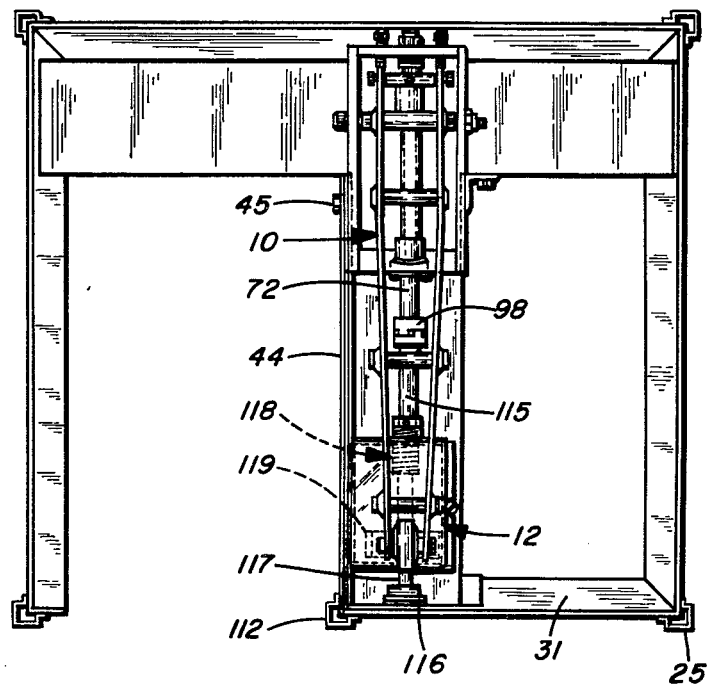
FIG. 6 is a top plan view, partially in section and partially cut-away, taken along the line 6—6 of FIG. 4.
Figure 7:
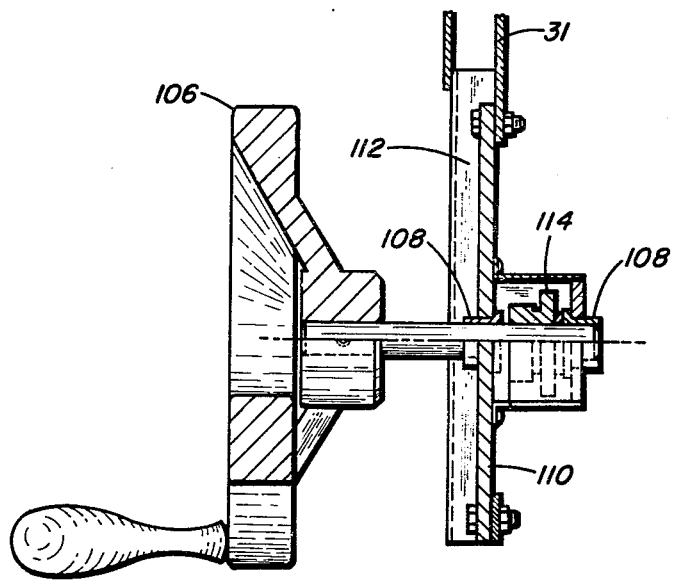
FIG. 7 is a fragmentary, side elevation view taken along the line 7—7 of FIG. 5.

Another embodiment of the present invention is illustrated in FIGS. 4 to 7. In this form the drive mechanism 12 is provided in the form of a manually-operated crank assembly 104. As shown in FIGS. 4 and 7 the crank assembly 104 includes a rotatable crank wheel 106 which is mounted exteriorly of the frame 4 on a shaft 107 supported on the frame 4. As shown, the shaft 107 is journaled for rotation in bearings 108 and 109 for rotation about a generally horizontal axis which extends generally parallel to the rotational axis of the screw 72. The bearing 108 is mounted on plate 110 which is supported on the frame 4, being affixed to the corner post 25 and inner corner post 112 adjacent the front side of the frame 4. A drive sprocket 114 is supported at the end of the shaft 107 remote from the crankwheel 106 and disposed interiorly of the frame 4. As shown in FIGS. 4 and 5, a driven sprocket 116 is fixedly mounted on a drive shaft 117 which is journalled for rotation in a pillow block bearing 119 mounted on the base plate 48. The drive shaft 117 is axially aligned and coupled through the flexible coupling 98 to the screw 72. A flexible drive element, such as a chain 120 or the like, is wrapped in driving relation about the sprockets 114 and 116 whereupon rotation of the crank wheel 106 will impart rotation to the screw 72. Preferably, the sprocket 116 has a drive ratio of 2:1 with respect to the sprocket 114.

Figure 15:
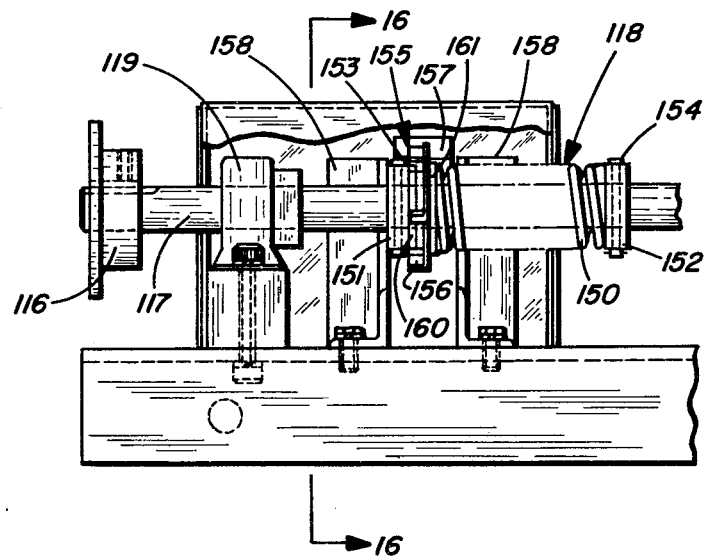
FIG. 15 is a side elevation view, partially in section and partially cut away showing the slip brake of the present invention.
Figure 13:
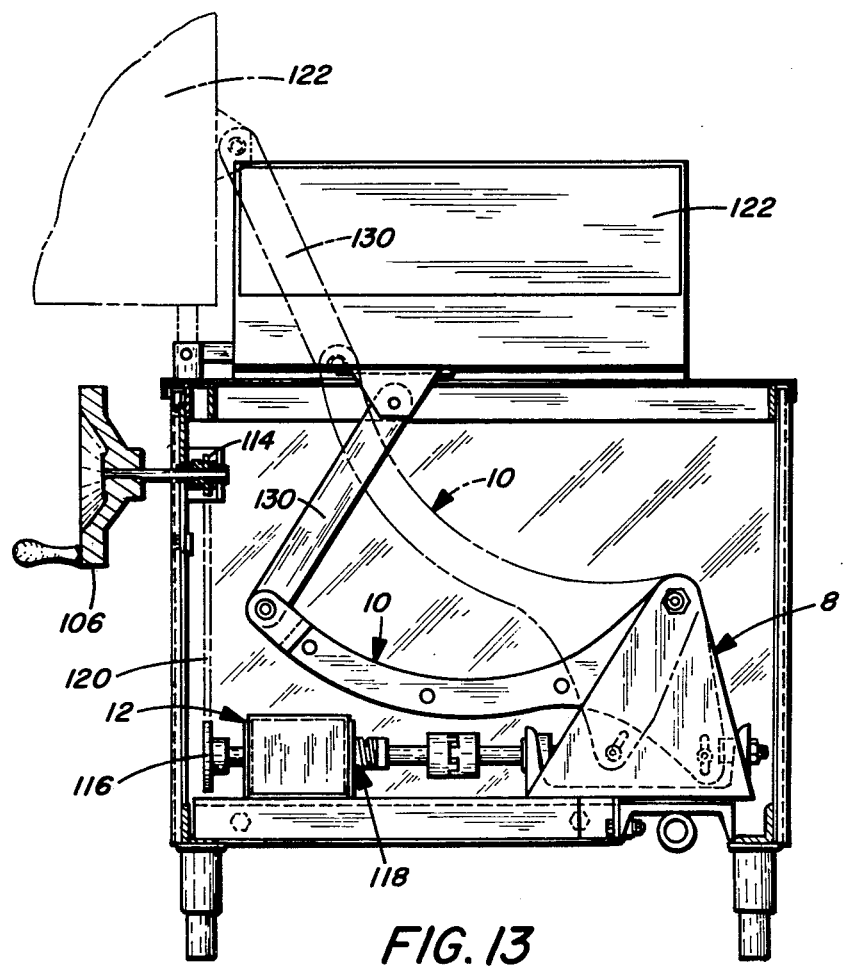
FIG. 13 is a side elevation view, partially in section, of another form of the embodiment shown in FIG. 11.
Figure 14:
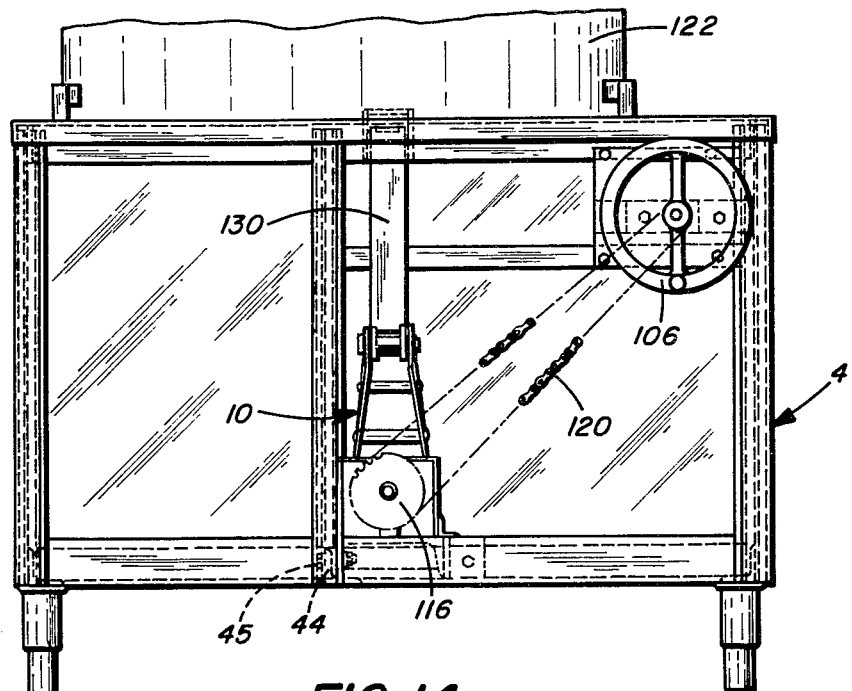
FIG. 14 is a front elevation view, partially in section and partially cut-away of the embodiment shown in FIG. 13.
Figure 16:
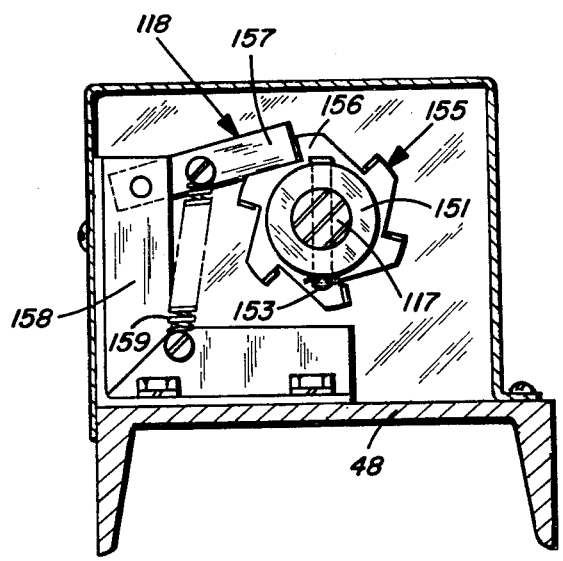
FIG. 16 is a transverse sectional view taken along the line 16—16 of FIG. 15.

As shown in FIGS. 4, 5 and 6, a slip brake assembly 118 is operably connected with the drive shaft 117 to prevent backdriving of the nut 78 on the screw shaft 72 in the event of a heavy kettle load. Of course, what would constitute a heavy kettle load would depend on the size of the kettle being used. Referring now to FIGS. 15 and 16, the brake assembly 118 comprises a helical spring 150 disposed circumferentially about the shaft 117. The spring 150 is compressed between a pair of annular collars 151 and 152 mounted on the shaft 117 and secured in position by pins 153 and 154 which extend diametrically through the collars 151 and 152 and the shaft 117. A ratchet member 155 is mounted on the shaft 117, between one end of the spring 150 and the collar 151, and has teeth 156 which project radially outwardly from the shaft 117 for engaging a dog element 157. The dog element 157 is pivotally mounted on posts 158 such as at 158, and a spring 159 is connected outwardly of the pivotal connection to urge the dog element 157 into interlocking abutting engagement with the teeth 156. The teeth 156 are arranged to allow the ratchet member 155 to rotate with the shaft in one direction, such as clockwise when viewing FIG. 16, while preventing its rotation in the opposite direction. More particularly, the ratchet member 155 is disposed between two flat washer-like layer friction material, as at 160 and 161, which are adhesively bonded to one side of the spring 150 and one side of the collar 151 for frictionally engaging opposite sides of the ratchet member 155 so that the shaft 117 can rotate, in the counterclockwise direction, although restrictedly, relative to the ratchet member 155. On the other hand, when the shaft 117 is rotated in a clockwise direction, the shaft 117 is free to rotate to raise the kettle. Depending upon the anticipated load in the kettle, a spring 150 is selected which will have a compressive force of predetermined magnitude to apply a frictional force on the ratchet member 155 to prevent rotation of the shaft 117, when the kettle is in the loaded raised position. On the other hand, the teeth ratio of 2:1 between the sprockets 116 and 114, in addition to the leverage provided by the crankwheel 106, enables an operator to overcome the frictional force between the ratchet member 155 and the layers 160 and 161 and manually rotate the shaft 117 against the pressure of the spring 150 to lower the kettle 21.

In FIGS. 11 to 14, there is illustrated another embodiment of the present invention. In this form, the cooker receptacle is provided in the form of a skillet 122 which is mounted on the frame 4 and is tiltable between a normal upright position, as indicated by the solid lines at 122 and a tilted pouring or discharge position as indicated by the phantom lines at 122.

Figure 11:
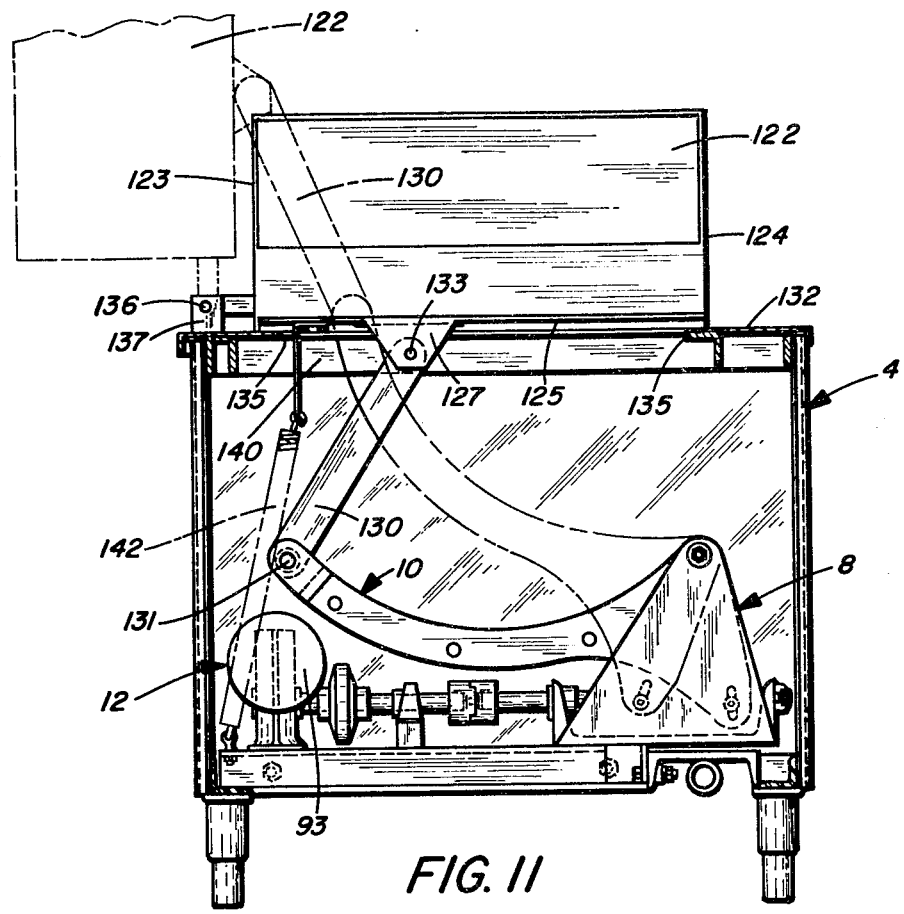
FIG. 11 is a side elevation view, partially in section and partially cut-away, showing still another embodiment of the present invention.

As shown in FIG. 11, the skillet 122 is defined by a front side 123, a rear side 124, and a bottom side 125. A flange member 127 depends downwardly from the bottom side 125 and is pivotally connected to the tilt arm 10 of the tilting mechanism 12. In the embodiment shosn in FIGS. 11 to 14, the frame 4 includes an upper support plate 132 which is supported on the struts 34, 35, 36 and 37 adjacent the upper ends of the corner posts 24, 25, 26 and 27. The support plate 132 includes a flat, generally horizontal upper surface for supporting the skillet 122 thereon. The support plate includes an opening defined by a marginal edge 135 through which the flange 127 extends for connection to the tilt arm 10. As shown in FIG. 11, the opening has a transverse dimension from front to rear which is less than the corresponding transverse dimension of the skillet 125, and as shown in FIG. 1, has a transverse dimension from side to side which is less than the corresponding transverse dimension of the skillet 122 so that the skillet 122 is seatingly supported in a generally longitudinal, upright position on the support plate 132 when the tilt arm 10 is in the lowered position.

Figure 12:
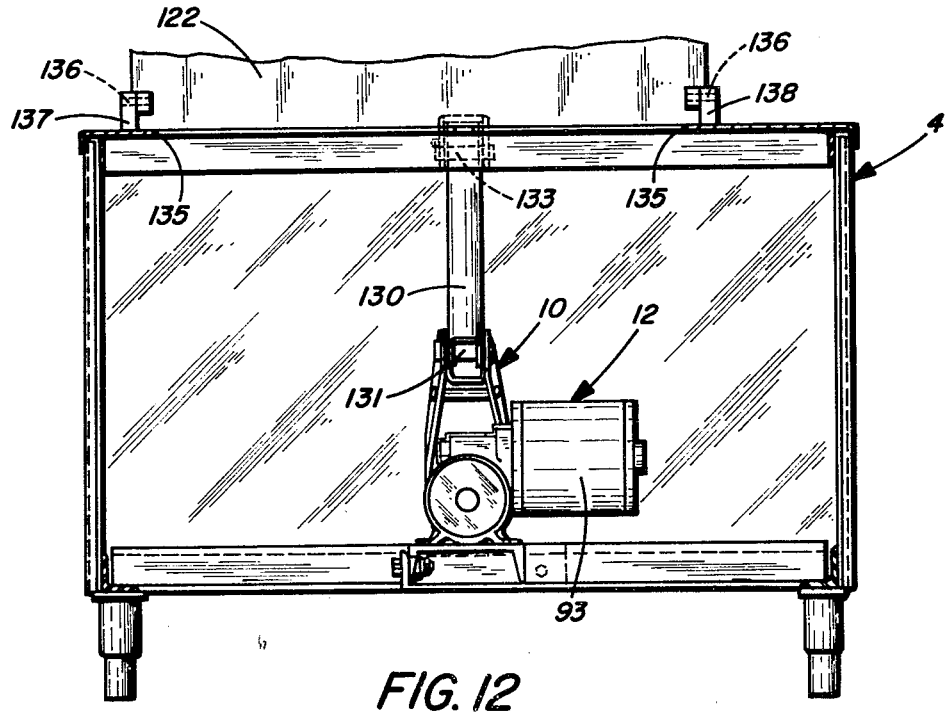
FIG. 12 is a front elevation view, partially in section, of the embodiment shown in FIG. 11.

As shown in FIGS. 11 and 12, the skillet 122 is pivotally connected, as at 136, to the frame 4 by hinge assemblies 137 and 138 which are mounted on the support plate 132. As shown, the hinge assemblies 137 and 138 are connected to the skillet 122 adjacent the front side 123 to enable the skillet to pivot forwardly toward its front side to discharge the contents therefrom. As shown in FIG. 11, a link arm 130 extends downwardly and forwardly from the bottom side 125 of the skillet 122 being pivotally connected at its lower end, such as by a pin 131, to the forward end of the tilt arm 10 and at its upper end, such as by a pin 133 to the flange 127. Another flange 140 is mounted on the skillet 122 adjacent the bottom side 125 and forwardly of the flange 127. The flange 140 depends downwardly from the skillet 122 and through the opening 135. A resilient return element, such as a helical spring 142, is connected at one end, such as its upper end, to the flange 140, and at its opposite end, such as the lower end, to the base plate 48 adjacent the forward side thereof.

As further shown in FIGS. 11 to 14, the tilt mechanism 8 is equally applicable in tilting the skillet 122 as in tilting the kettle 2 as described with respect to the embodiments shown in FIGS. 1 to 8. Accordingly, the tilt mechanism 8 can be operated by the drive mechanism 12 using either the electric motor 93 (FIGS. 1 to 3) or the manually-operable crank assembly 104 (FIGS. 4 to 7). By this arrangement, when the tilt assembly 8 is actuated, the tilt arm 10 will be raised toward the tilt position, causing the link arm 130 to be rotated forwardly about the pivotal connection 131, such as in a counter clockwise direction when viewing FIG. 11, and rearwardly about the pivotal connection 133, such as clockwise when viewing FIG. 11, to force the skillet 122 to be tilted pouring or discharge position. Of course, reverse actuation of the tilt mechanism 8 will cause the tilt arm to move toward its lower position to cause the skillet 122 to pivot backwardly about the pivotal connections 136 into seated engagement on the support surface 132 for positioning in the upright position.

We claim:

1. A tiltable cooking receptacle apparatus comprising, a frame, a receptacle supported on said frame for tilting movement in one direction between an upright position and a discharge position, a tilting mechanism is mounted on said frame for tilting said receptacle, said tilting mechanism includes a tilt arm for applying a lifting force to at least one side of said receptacle, said tilt arm is mounted on said frame for movement in a direction opposite to the direction of pivotal movement of said receptacle between a lowered non-tilting position and a raised tilting position, selectively actuatable drive means is operably connected to said tilt arm for moving said tilt arm between said lowered and raised positions to tilt said receptacle into said discharge position, and said tilt arm is pivotally supported on said frame having one end disposed for camming coacting engagement with said one side of said receptacle for tilting said receptacle toward said one side.

2. An apparatus in accordance with claim 1, wherein said tilt arm is pivotally connected to said receptacle.

3. An apparatus in accordance with claim 1, wherein a link arm pivotally connects said tilt arm to said receptacle.

4. An apparatus in accordance with claim 3, wherein said link arm projects outwardly from said receptacle being pivotally connected at one end to said receptacle and at its opposite end to said tilt arm, and said link arm is pivotable in a direction opposite to the direction of pivotal movement of said tilt arm during actuation of said tilt assembly.

5. A tiltable cooking receptacle apparatus comprising, a frame, a receptacle supported on said frame for tilting movement in one direction between an upright position and a discharge position, a tilting mechanism is mounted on said frame for tilting said receptacle, said tilting mechanism includes a tilt arm for applying a lifting force to at least one side of the receptacle, said tilt arm is mounted on said frame for movement between a lowered nontilting position and a raised tilting position in a direction opposite the direction of pivotal movement of said receptacle, selectively actuatable drive means is operably connected to said tilt arm for moving said tilt arm between said lowered and raised positions to tilt said receptacle into said discharge position, said tilt arm is pivotally supported on said frame between its opposed ends, one end of said tilt arm is pivotally engaged with said one side of said receptacle, the other end of said tilt arm is operably connected to said drive means, and said drive means is cammingly coupled to said other end of said tilt arm to move said tilt arm to said raised position to position said receptacle in said discharge position, and move said tilt arm to said lowered position for positioning said receptacle in said upright position.

6. Apparatus in accordance with claim 5 wherein said receptacle is pivotally connected to said frame adjacent said one side, and
said one side is the discharge side of said receptacle.

7. An apparatus in accordance with claim 5, wherein said tilt arm is pivotally supported on said frame between its opposed ends,
one end of said tilt arm is disposed for camming coacting engagement with said receptacle, and
the other end of said tilt arm is operably connected to said drive means.

8. An apparatus in accordance with claim 5, wherein said drive means is pivotally coupled to said tilt arm.

9. An apparatus in accordance with claim 5, wherein said drive means comprises a rotatable drive assembly coupled to the other end of said tilt arm.

10. An apparatus in accordance with claim 7, wherein
said rotatable drive assembly includes power means, and said power means comprises a rotatable power unit.

11. An apparatus in accordance with claim 7, wherein
said rotatable drive assembly includes power means, and said power means comprises a hand crank.

12. An apparatus in accordance with claim 5, wherein
said drive means comprises a rotatable drive member pivotally coupled at one end to said tilt arm,
power means operably connected to said rotatable member at the end remote from said tilt arm for rotating said rotatable member to cause pivoting of said tilt arm.

13. A tiltable cooking receptacle apparatus comprising,
a frame,
a receptacle supported on said frame for tilting movement in one direction between an upright position and a discharge position,
a tilting mechanism is mounted on said frame for tilting said receptacles,
tilting mechanism includes a tilt arm for applying a lifting force to at least one side of said receptacle,
said tilt arm is mounted on said frame for movement between a lowered nontilting position and a raised tilting position in a direction opposite to the direction of pivotal movement of said receptacle, selectively actuatable drive means is operably connected to said tilt arm for moving said tilt arm between said lowered and raised positions to tilt said receptacle into said discharge position, said tilt arm is pivotally supported on said frame between its opposed ends, one end of said tilt arm is disposed for camming coacting engagement with said receptacle, the other end of said tilt arm is operably connected to said drive means, and said drive means is cammingly coupled to said other end of the tilt arm.

14. A tiltable cooking receptacle apparatus comprising,
a frame,
a receptacle supported on said frame for tilting movement in one direction between an upright position and a discharge position,
a tilting mechanism is mounted on said frame for tilting said receptacle,
said tilting mechanism includes a tilt arm for applying a lifting force to at least one side of said receptacle,
said tilt arm is mounted on said frame for movement between a lowered nontilting position and a raised tilting position in a direction opposite to the direction of pivotal movement of said receptacle, selectively actuatable drive means is operably connected to said tilt arm for moving said tilt arm between said lowered and raised positions to tilt said receptacle into said discharge position, said drive means comprises a rotatable drive member pivotally coupled at one end to said tilt arm, power means operably connected to said rotatable drive member at the end remote from said tilt arm for rotating said rotatable drive members to cause pivoting of said tilt arm, and said rotatable drive member is connected in camming sliding relation to said tilt arm.

15. A tiltable cooking receptacle apparatus comprising,
a frame,
a receptacle supported on said frame for tilting movement in one direction between an upright position and a discharge position,
a tilting mechanism is mounted on said frame for tilting said receptacle,
said tilting mechanism includes a tilt arm for applying a lifting force to at least one side of said receptacle,
said tilt arm is mounted on said frame for movement between a lowered nontilting position and a raised tilting position in a direction opposite to the direction of pivotal movement of said receptacle, selectively actuatable drive means is operably connected to said tilt arm for moving said tilt arm between said lowered and raised positions to tilt said receptacle into said discharge position, said drive means includes a rotatable screw member, rotatable power means is drivingly connected to said screw member for imparting rotation thereto, a nut member is threadably connected to said screw member at the end remote from said power means being operably connected to said tilt arm, and a pin member is mounted on said nut and is connected in camming sliding relation to said tilt arm to cause pivotal movement of said tilt arm upon rotation of said screw.

16. A tiltable cooking receptacle apparatus comprising,
a frame,
a receptacle supported on said frame for tilting movement in one direction between an upright position and a discharge position,
a tilting mechanism is mounted on said frame for tilting said receptacle,
said tilting mechanism includes a tilt arm for applying a lifting force to at least one side of said receptacle,
said tilt arm is mounted on said frame for movement between a lowered non-tilting position and a raised tilting position in a direction opposite to the direction of pivotal movement of said receptacle,
selectively actuatable drive means is operably connected to said tilt arm for moving said tilt arm between said lowered and raised positions to tilt said receptacle into said discharge position,
said tilt arm includes a roller at one end, and
said roller rollingly engages said receptacle during movement of said tilt arm between said lowered and raised positions.

17. An apparatus in accordance with claim 16, wherein
said kettle includes a runner plate, and
said roller is disposed for rolling engagement with said runner plate.

18. A tiltable cooking receptacle apparatus comprising,
a frame,
a receptacle supported on said frame for tilting movement in one direction between an upright position and a discharge position,
a tilting mechanism is mounted on said frame for tilting said receptacle,
said tilting mechanism includes a tilt arm for applying a lifting force to at least one side of said receptacle,
said tilt arm is mounted on said frame for movement between a lowered non-tilting position and a raised tilting position in a direction opposite to the direction of pivotal movement of said receptacle,
selectively actuatable drive means is operably connected to said tilt arm for moving said tilt arm between said lowered and raised positions to tilt said receptacle into said discharge position,
said tilt arm is pivotally supported on said frame between its opposed ends,
one end of said tilt arm is disposed for camming coacting engagement with said receptacle,
the other end of said tilt arm is operably connected to said drive means,
said drive means comprises a rotatable drive assembly coupled to the other end of said tilt arm,
said rotatable drive assembly includes power means,
said power means comprises a hand crank,
said hand crank is rotatable in one direction to raise said receptacle and rotatable in the opposite direction to lower said receptacle, and
slip brake means is operably connected to said drive assembly to restrict lowering movement of said receptacle.

* * * * *